United States Patent
El Katerji et al.

(10) Patent No.: US 12,476,002 B2
(45) Date of Patent: Nov. 18, 2025

(54) INTERFACE BETWEEN HEART PUMP CONTROLLER DATABASE AND HOSPITAL

(71) Applicant: ABIOMED, Inc., Danvers, MA (US)

(72) Inventors: Ahmad El Katerji, Danvers, MA (US); Dawn Bardot, Danvers, MA (US)

(73) Assignee: ABIOMED, INC., Danvers, MA (US)

(*) Notice: Subject to any disclaimer, the term of this patent is extended or adjusted under 35 U.S.C. 154(b) by 447 days.

(21) Appl. No.: 17/851,631

(22) Filed: Jun. 28, 2022

(65) Prior Publication Data

US 2023/0011929 A1 Jan. 12, 2023

Related U.S. Application Data

(60) Provisional application No. 63/216,931, filed on Jun. 30, 2021.

(51) Int. Cl.
*G16H 40/67* (2018.01)
*A61M 1/36* (2006.01)
*G16H 10/60* (2018.01)

(52) U.S. Cl.
CPC .......... *G16H 40/67* (2018.01); *A61M 1/3666* (2013.01); *G16H 10/60* (2018.01)

(58) Field of Classification Search
None
See application file for complete search history.

(56) References Cited

U.S. PATENT DOCUMENTS 9,117,183 B2 * 8/2015 Buchan .................. G06F 30/20
10,535,423 B2 * 1/2020 Dunsirn ................ A61M 5/142
2013/0138452 A1 * 5/2013 Cork .................. G06Q 10/1093 705/2
2013/0173307 A1 * 7/2013 Gejdos .................. G16H 10/60 705/3
2013/0317852 A1 * 11/2013 Worrell .................. G16H 40/63 705/2
2016/0151553 A1 * 6/2016 Bonde ................. A61M 60/538 455/411
2017/0169168 A1 * 6/2017 Batchelor ............... G06F 21/31
2020/0098473 A1 3/2020 Agnello et al.
2020/0302206 A1 9/2020 Lemay et al.
2020/0312450 A1 10/2020 Agnello et al.
2020/0314207 A1 10/2020 Agnello et al.

(Continued)

OTHER PUBLICATIONS

Goldstein, Daniel; Oz, Mehmet; Rose, Eric; Implantable Left Ventricular Assist Devices, Nov. 19, 1998, New England Journal of Medicine, vol. 339(21), pp. 1522-1533 (Year: 1998).*

(Continued)

*Primary Examiner* — Jeff Zimmerman
(74) *Attorney, Agent, or Firm* — Botos Churchill IP Law LLP

(57) ABSTRACT

An electronic interface facilitates automatically transferring data from a heart pump controller database to an EMR system, thereby reducing or eliminating the need for caregivers to manually transcribe heart pump operational data from a heart pump controller screen to the EMR system. Some embodiments reduce or eliminate the need to periodically visit a patient to record the operational data. Instead, once programmed, the interface can automatically periodically send the operational data to the EMR system.

20 Claims, 9 Drawing Sheets

(56) References Cited

U.S. PATENT DOCUMENTS

2020/0411181 A1    12/2020   Agnello et al.

OTHER PUBLICATIONS

International Search Report and Written Opinion for Application No. PCT/US22/35277 dated Oct. 20, 2022 (19 pages).
"Cloud database", Wikipedia, May 5, 2021, Retrieved from the Internet: URL:https://en.wikipedia.org/w/index.php?title=Cloud_database&oldid=1021560315, [retrieved on Oct. 12, 2022], 8 pages.
"Ventricular assist device", Wikipedia (May 6, 2021), available at https://en.wikipedia.org/w/index.php?title=Ventricular_assist_device&oldid=1021717463 [retrieved on Oct. 12, 2022], 16 pages.

\* cited by examiner

*(Prior Art)*
*Fig. 3*

INTERFACE BETWEEN HEART PUMP CONTROLLER DATABASE AND HOSPITAL

CROSS-REFERENCE TO RELATED APPLICATIONS

This application claims the benefit of and priority from U.S. Provisional Application No. 63/216,931, which was filed in the United States Patent Office on Jun. 30, 2021, and is incorporated by reference herein.

TECHNICAL FIELD

The present invention relates to an electronic interface between disparate medical systems and, more particularly, to an electronic interface between a heart pump control database and an electronic medical records (EMR) system, in which the interface automatically facilitates transfer of data from the heart pump control database to the EMR system.

BACKGROUND OF THE INVENTION

An intravascular blood pump is a pump that can be advanced through a patient's blood circulatory system, i.e., veins and/or arteries, to a position in the patient's heart or elsewhere within the patient's circulatory system. For example, an intravascular blood pump may be inserted via a catheter and positioned to span a heart valve. The intravascular blood pump is typically disposed at the end of the catheter. Once in position, the pump may be used to pump blood through the circulatory system and, therefore, temporarily reduce workload on the patient's heart, such as to enable the heart to recover after a heart attack. An exemplary intravascular blood pump is available from Abiomed, Inc., Danvers, MA under the tradename Impella® heart pump.

Each intravascular blood pump is typically connected to a respective external heart pump controller that controls the heart pump, such as motor speed, and collects and displays operational data about the blood pump, such as heart signal level, battery temperature, blood flow rate and plumbing integrity. An exemplary heart pump controller is available from Abiomed, Inc. under the trade name Automated Impella Controller®. The controller raises alarms when operational data values fall beyond predetermined values or ranges, for example if a leak or loss of suction is detected. The controller includes a video display screen as a human user interfaces, on which the operational data and/or alarms are displayed.

An electronic medical records (EMR) system stores, and facilitates entry of, information about patients, typically via a computer terminal. Essentially, an EMR system is an electronic equivalent of paper records, charts, clinician notes, etc. An EMR system typically stores general information about patients, such as next of kin, doctor name, prescribed drugs and other current treatment and medical history, including results of diagnostic tests, such as blood pressure, pulse rate and laboratory tests. EMR data is entered over time, as this information is collected by individual medical practitioners. The information in an EMR system is helpful, sometimes vital, to clinicians in reviewing a patient's progress and in planning the patient's treatment.

A patient with an intravascular blood pump is typically in critical condition and therefore requires frequent monitoring, because the patient's condition (ex., pulse, blood pressure, etc.) may dramatically change very quickly, sometimes in a matter of minutes. Changes in the patient's condition may require changes in operating parameters of the blood pump, changes in medication, etc. Since clinicians rely on the information about the patient that is stored in the patient's EMR, the EMR should be updated timely and frequently.

However, keeping the EMR up to date conventionally involves a labor-intensive and inaccurate manual process. Conventionally, to keep the patient's EMR up to date, a nurse or technician periodically visits the patient's hospital room, records on paper operational data displayed on the heart pump controller's display screen and then goes to a computer terminal, typically at a nursing station, and enters the collected operational data into the EMR system.

However, nurses and technicians are increasingly busy dealing with other patients. Therefore, returning to the heart pump patient's room at frequent regular intervals to record the operational data is difficult. In addition, as noted, the heart pump patient is in critical condition and therefore needs rest. Frequent visitors to the patient's room interrupt the patient's rest. Furthermore, manually recording the operational data from the display screen and then manually entering the collected operational data into the EMR system is prone to error.

In addition, data entered manually into an EMR system is typically stored as unstructured (free text) data, which cannot be read by other systems, sometimes even systems that include sophisticated natural language processors. For example, unstructured patient data in one hospital EMR system is likely to be of limited use if the patient is transferred, or subsequently admitted, to a different hospital.

On the other hand, structured data follow a prescribed data model and value set, constraining users, for example to enter or choose only pre-determined values or value types or a controlled vocabulary. A piece of structured data consists of two parts: a variable name and a value, for example "height: 71." Structured data are usable by multiple systems, such as databases across multiple hospitals and clinician offices. Correctly manually entering structured data into an EMR system is not always possible, and in any case is much more difficult than entering unstructured data.

Nevertheless, the patient's clinicians rely on timely and complete information in the EMR system to monitor the patient and to inform decisions about adjusting the patient's care prescription. Unfortunately, the state of the art largely prevents clinicians from having the timely and accurate information they need. Thus, a technical problem posed by the prior art is how to timely, and ideally automatically, collect information about heart pump patients and heart pumps and store the collected information as structured data in an EMR.

BRIEF SUMMARY OF THE INVENTION

One aspect of the present disclosure relates to a heart pump data synchronizer for time-correlated data. The heart pump data synchronizer may include a heart pump identifier, a network interface, a data item identifier, a controller, a monitor, and an output portal, each of which is configured for addition to, and operation within, an electronic medical records (EMR) system that is accessible according to patient identifiers and that stores information about a plurality of heart pump patients and a plurality of non-heart pump patients. The heart pump identifier may include a first user interface configured to display a first prompt to a user for a locally-entered identifier of at least one of a heart pump or a patient having an implanted heart pump. The network interface may be configured to communicate via a wide-area computer network with a cloud-based server that is distinct from and otherwise lacking a communication link with the EMR system and that stores historical time-correlated operation data about a plurality of implanted heart pumps, the historical operation data comprising a plurality of data types for each implanted heart pump. The data item identifier may include a second user interface configured to display a second prompt to the user for a time and an identification of at least one data type of the plurality of data types, the time and the at least one data type identification being associated with the locally-entered identifier. The controller may be communicatively coupled to the heart pump identifier, the network interface, and the data item identifier and configured, in response to receipt of the locally-entered identifier, the time, and the at least one data type identification, to send, via the network interface, the locally-entered identifier, the time, the at least one data type identification, and a request for data corresponding thereto, to the cloud-based server. The monitor may be communicatively coupled to the network interface and configured to receive, via the network interface, from the cloud-based server, corresponding data transmitted by the cloud-based server in response to the request. The output portal may be communicatively coupled to the monitor and configured to display the corresponding data, received from the cloud-based server, to the user.

In some implementations, the heart pump data synchronizer may also include a data selector and an EMR data updater, both of which are configured for addition to, and operation within, the EMR system. The data selector may include a third user interface configured to display a third prompt to the user for an indication selecting at least a portion of the corresponding data displayed to the user. The EMR data updater may be configured to store, as structured data, in the EMR system, in association with a patient identifier, the selected at least a portion of the corresponding data displayed to the user. In some implementations, the monitor may be configured to receive, via the network interface, from the cloud-based server, a patient identifier that corresponds to the data transmitted by the cloud-based server in response to the request, and the EMR data updater may be configured to store the selected at least a portion of the corresponding data in the EMR system in association with the patient identifier received by the monitor. In some implementations, the locally-entered identifier may include a patient identifier, and the EMR data updater may be configured to store the selected at least a portion of the corresponding data in the EMR system in association with the locally-entered identifier.

In some implementations, each implanted heart pump may be mechanically coupled to a respective heart pump controller that includes a display screen on which are displayed operation data of the implanted heart pump, and each heart pump controller may be configured to send to the cloud-based server a respective video stream that represents contents of the display screen. In some implementations, the historical time-correlated operation data stored by the cloud-based server is at least partially derived by the cloud-based server from respective video streams from respective heart pump controllers. In some implementations, the corresponding data received by the monitor from the cloud-based server may be non-video data. In some implementations, the output portal includes a video signal synthesizer configured to at least partially recreate, from the corresponding data, a video stream to thereby display the corresponding data to the user.

In some implementations, the locally-entered identifier may include a serial number of a respective implanted heart pump. In some implementations, the locally-entered identifier may include a patient identifier. In some implementations, the historical operation data may include at least one of: a blood pressure as measured by a blood pump, a blood pump motor speed, a blood pump motor current, a rate of heparin infusion by a blood pump or blood pump purge information. In some implementations, the network interface is may be configured to communicate with the cloud-based server via an application programming interface (API) provided by the cloud-based server.

In some implementations, the heart pump data synchronizer may also include a scanner configured to read a barcode that represents a heart pump identifier and provide the heart pump identifier as the locally-entered identifier. In some implementations, the scanner is wirelessly communicatively coupled to the heart pump identifier. In some implementations, the heart pump data synchronizer may also include a camera configured to read indicia that represents a heart pump identifier and provide the heart pump identifier as the locally-entered identifier. In some implementations, the camera is wirelessly communicatively coupled to the heart pump identifier.

Another aspect of the present disclosure relates to a heart pump data synchronizer for time-correlated data. The heart pump data synchronizer may include a heart pump identifier, a network interface, a data item identifier, a controller, a monitor, and an electronic medical records (EMR) data updater, each of which is configured for addition to, and operation within, an EMR system that is accessible according to patient identifiers and that stores information about a plurality of heart pump patients and a plurality of non-heart pump patients. The heart pump identifier may include a user interface configured to display a first prompt to a user for a locally-entered identifier of at least one of a heart pump or a patient having an implanted heart pump. The network interface may be configured to communicate via a wide-area computer network with a cloud-based server that is distinct from and otherwise lacking a communication link with the EMR system and that stores historical time-correlated operation data about a plurality of implanted heart pumps, the historical operation data comprising a plurality of data types for each implanted heart pump. The data item identifier may include a user interface configured to display a second prompt to the user for an identification of at least one data type of the plurality of data types, the at least one data type identification being associated with the locally-entered identifier. The controller may be communicatively coupled to the heart pump identifier, the network interface, and the data item identifier, and configured, in response to receipt of the locally-entered identifier and the at least one data type identification, to send, via the network interface, the locally-entered identifier, the at least one data type identification, and a request for data corresponding thereto, to the cloud-based server. The monitor may be communicatively coupled to the network interface and configured to receive, via the network interface, from the cloud-based server, corresponding data transmitted by the cloud-based server in response to the request. The EMR data updater may be configured to automatically store, as structured data, in the EMR system, in association with a patient associated with the locally-entered identifier, the corresponding data received by the monitor.

In some implementations, the plurality of data types may include at least two of: a blood pressure as measured by a blood pump, a blood pump motor speed, a blood pump motor current, a rate of heparin infusion by a blood pump or blood pump purge information. In some implementations, the user interface of the data item identifier is further configured to input from the user, in association with the identification of the at least one data type, an update interval. In some implementations, the controller is further configured, in response to receipt of the update interval, to automatically request updated corresponding data, via the network interface, from the cloud-based server, at the update interval. In some implementations, the EMR data updater is further configured to automatically store, as structured data, in the EMR system, in association with the patient, the updated corresponding data received by the monitor.

Yet another aspect of the present disclosure relates to a method for controlling a heart pump data synchronizer. The heart pump data synchronizer may include a heart pump identifier, a network interface, a data item identifier, a controller, a monitor, and an output portal, each of which is configured for addition to, and operation within, an electronic medical records (EMR) system that is accessible according to patient identifiers and that stores information about a plurality of heart pump patients and a plurality of non-heart pump patients. The network interface may be configured to communicate via a wide-area computer network with a cloud-based server that is distinct from and otherwise lacking a communication link with the EMR system and that stores historical time-correlated operation data about a plurality of implanted heart pumps, the historical operation data comprising a plurality of data types for each implanted heart pump. The method may include: displaying, with a first user interface of the heart pump identifier, a first prompt to a user for a locally-entered identifier of at least one of a heart pump or a patient having an implanted heart pump; displaying, with a second user interface of the data item identifier, a second prompt to the user for a time and an identification of at least one data type of the plurality of data types, the time and the at least one data type identification being associated with the locally-entered identifier; sending, with the controller via the network interface, the locally-entered identifier, the time, the at least one data type identification, and a request for data corresponding thereto to the cloud-based server; receiving, with the monitor via the network interface, corresponding data transmitted by the cloud-based server in response to the request; and displaying, with the output portal, the corresponding data to the user. In some implementations, the heart pump data synchronizer also includes an EMR data updater configured for addition to, and operation within, the EMR system, and the method also includes storing, with the EMR data updater, as structured data, in association with the locally-entered identifier, at least a portion of the corresponding data displayed to the user.

Yet another aspect of the present disclosure relates to a non-transitory computer readable storage medium having instructions stored thereon that, when executed by one or more processors, cause the one or more processors to control a heart pump data synchronizer. The heart pump data synchronizer may include a heart pump identifier, a network interface, a data item identifier, a controller, a monitor, and an output portal, each of which is configured for addition to, and operation within, an electronic medical records (EMR) system that is accessible according to patient identifiers and that stores information about a plurality of heart pump patients and a plurality of non-heart pump patients. The network interface may be configured to communicate via a wide-area computer network with a cloud-based server that is distinct from and otherwise lacking a communication link with the EMR system and that stores historical time-correlated operation data about a plurality of implanted heart pumps, the historical operation data comprising a plurality of data types for each implanted heart pump. Controlling the heart pump data synchronizer may include: controlling a first user interface of the heart pump identifier to display a first prompt to a user for a locally-entered identifier of at least one of (a) a heart pump or (b) a patient having an implanted heart pump; controlling a second user interface of the data item identifier to display a second prompt to the user for a time and an identification of at least one data type of the plurality of data types, the time and the at least one data type identification being associated with the locally-entered identifier; sending, via the network interface, the locally-entered identifier, the time, the at least one data type identification, and a request for data corresponding thereto to the cloud-based server; and controlling the output portal to display corresponding data transmitted by the cloud-based server in response to the request and received by the monitor via the network interface. In some implementations, the heart pump data synchronizer also includes an EMR data updater configured for addition to, and operation within, the EMR system, and controlling the heart pump data synchronizer also includes storing, with the EMR data updater, as structured data, in association with the locally-entered identifier, at least a portion of the corresponding data displayed to the user.

BRIEF DESCRIPTION OF THE DRAWINGS

The Invention Will be More Fully Understood by Referring to the Following Detailed Description of Specific Embodiments in Conjunction with the Drawings, of which:

FIG. 3 is an exemplary hypothetical display provided by a monitoring station of FIG. 2, according to the prior art.

DETAILED DESCRIPTION

Figure 1:
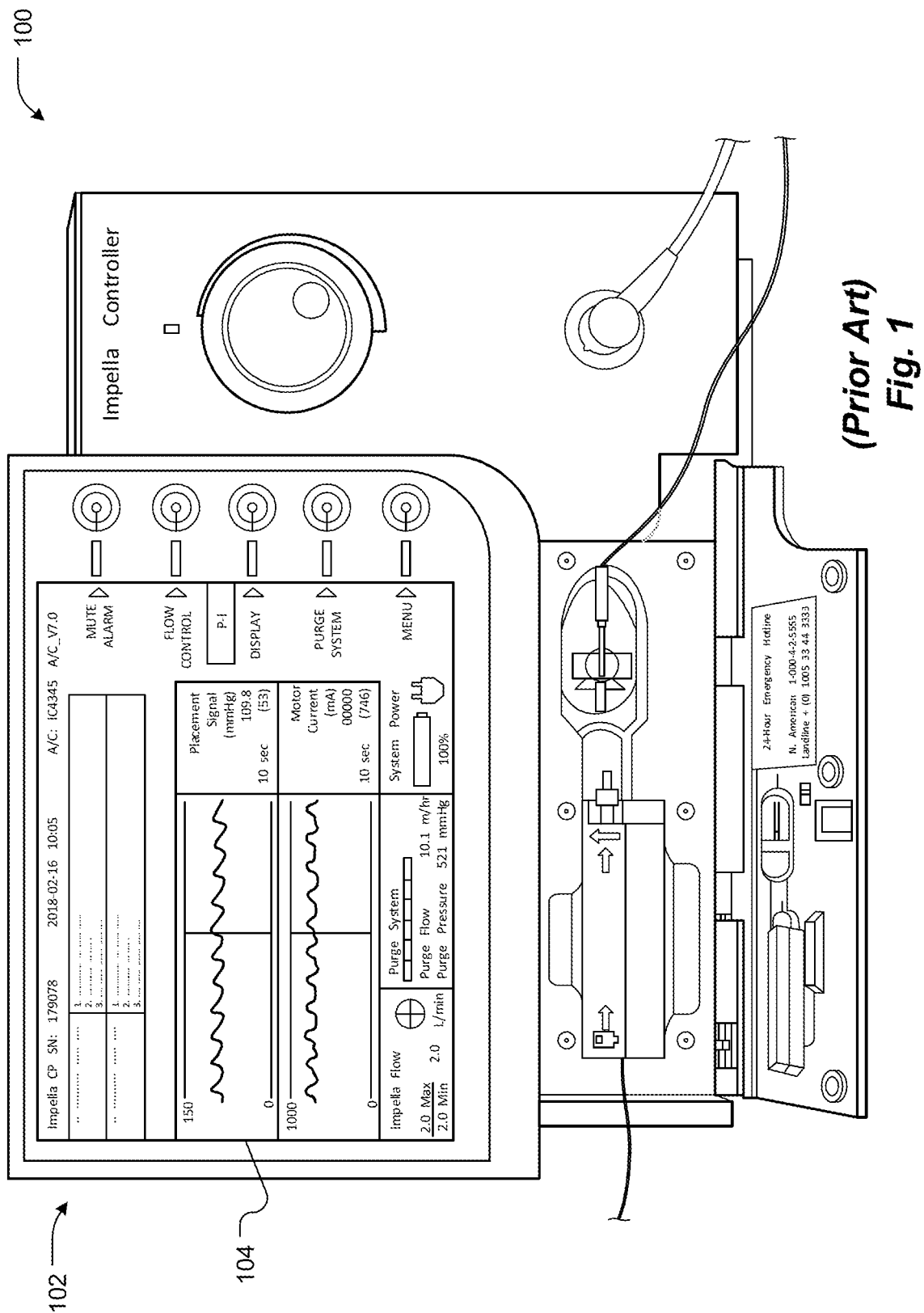
FIG. 1 is a front view of a heart pump controller, according to the prior art.

Embodiments of the present invention include electronic interfaces between heart pump controller databases and EMR systems. Each heart pump controller database automatically stores time-correlated information from a plurality of possibly geographically dispersed heart pump controllers via computer network connections. For example, the heart pump controllers may be distributed among a plurality of unaffiliated hospitals.

The heart pump controller database stores the information over time. Thus, the heart pump controller database stores historical and current information about each heart pump and its associated controller. The heart pump controller database is typically remote from a hospital or other clinical setting, in which the heart pumps and their respective controllers reside. Often, the heart pump controller database is operated by, and located in a facility of, a heart pump manufacturer.

Embodiments of the present invention facilitate semi-manually or automatically transferring data from the heart pump controller databases to the EMR systems, thereby reducing or eliminating the need for a nurse or technician to manually transcribe the heart pump operational data from the heart pump controller screen to the EMR system. Some embodiments reduce or eliminate the need to periodically visit a patient to record the operational data. Since the heart pump controller database stores historical information, an embodiment of the interface facilitates obtaining past information from the heart pump controller database and semi-manually transferring the past information into the EMR system, thereby eliminating a need to timely visit each heart pump controller to record the information. Another embodiment, once programmed, automatically periodically fetches and sends the operational data from the heart pump controller database to the EMR system, thereby eliminating a need to periodically visit each heart pump controller, or even access past data, to record the information in the EMR system.

Each embodiment may be implemented as a software application having one or more of several capabilities. The application may be executed within the EMR system and may, therefore, be accessible via computer terminals outside the patient's room, such as at a clinician's work station, thereby eliminating a need to visit each patient's room to record the information and, consequently, disturb the patient. The application remotely accesses the heart pump controller database and can display historical data about a user-selected heart pump.

An embodiment is implemented as a viewer that displays a web page, in which the web page displays the historical data. The viewer accesses the heart pump controller database and displays user-selected data fetched therefrom. Thus, in this embodiment, the user can look up data from a required time in the past, read the data displayed by the viewer and then manually enter that data into the EMR system, without having to visit the heart pump controller to collect the information at precise times or intervals.

Another embodiment essentially enables the user to "copy and paste" data, displayed by a viewer as above, from the heart pump controller database data store to the EMR system, without requiring the user to manually enter the data. Since this embodiment provides specific fields from which the user can copy the data, each field can be associated with a particular data item type. Thus, the embodiment imposes a structure on the pasted data, and the pasted data can be stored in the EMR as structured data.

Yet another embodiment, once programmed, periodically automatically fetches data from the heart pump controller and/or the historical information stored in the heart pump controller database, reformats the data as necessary, and stores the data into the EMR system. The reformatting may involve optical character recognition (OCR) of the real-time or historical data prior to storing the data into the EMR system. This embodiment imposes a structure on the pasted data, and the data can be stored in the EMR as structured data.

Figure 2:
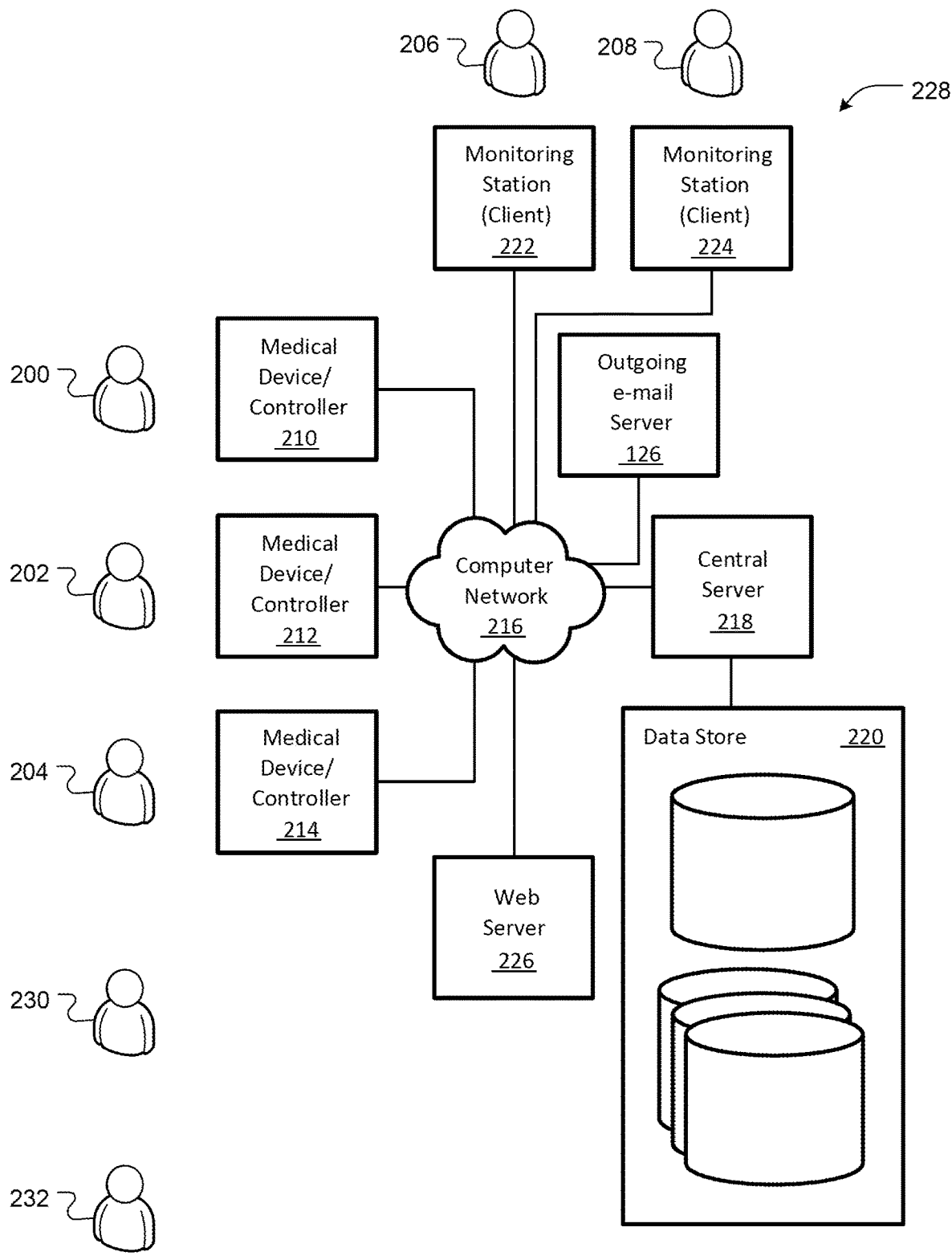
FIG. 2 is a schematic block diagram of a cloud-based system for collecting operational data from hear pump controllers, as in FIG. 1, storing the data in a data store and proving the data to monitoring stations, according to the prior art.

FIG. 1 illustrates an exemplary heart pump controller 100, in this case an Abiomed Automated Impella Controller, including exemplary operational data 102 displayed on a display screen 104. As shown in FIG. 2, to facilitate remotely monitoring heart pump patients, exemplified by patients 200, 202 and 204, by medical personnel, exemplified by personnel 206 and 208, such as to ensure efficacy and patient safety, a heart pump controller, exemplified by controllers 210, 212 and 214, may be coupled via a computer network 216 to one or more central servers, exemplified by server 218. Each server 218 may be located at, and/or be operated by, the manufacturer of the heart pumps and/or the manufacturer of the heart pump controllers 210-214.

The heart pump controllers 210-214 send the operational data 102 (FIG. 1), via the network 216, to the server 218, which stores the data in a time-correlated data store 220. That is, each datum is stored with a time indicating when the datum was captured, or the datum is stored in a way that the time of capture can be calculated. In some cases, the server 218 fetches the operational data 102, via the network 216, from the heart pump controllers 210-214, instead of, or in addition to, the heart pump controllers 210-214 sua sponte sending the data 102, i.e., not in response to individual requests from the server 218. In either case, the data store 220 stores historical data about the heart pump controllers 210-214 and, at least implicitly, about the patients 200-204 in whom the heart pumps are implanted.

Table 1 lists exemplary types of information 102 that may be stored in the data store 220 of the server 218 and may, therefore, be accessed by embodiments of the present invention. Any particular data store 220 need not necessarily store all the data types listed in Table 1, and some data stores 220 may store additional data types not listed in Table 1.

TABLE 1

| Exemplary Information from Heart Pump Controller |
|---|
| Controller serial number |
| Controller software version number |
| Controller firmware version number |
| Controller hardware version number |
| Pump serial number |
| Pump model number |
| Patient name |

TABLE 1-continued

Exemplary Information from Heart Pump Controller

Patient identification number (could be alphabetic or alphanumeric)
Battery charge level
Power source (mains or battery)
Mean arterial pressure (entered by operator)
Cardiac output
Native cardiac output
Dextrose infusion
Dextrose concentration (%)
Heparin infusion
Heparin concentration (IU/ml)
Aortic pressure (AOP)
Mean AOP
Left ventricular end-diastolic pressure (LVEDP)
Left ventricular pressure (LVP)
Purge flow
Purge pressure
Pump flow (instantaneous)
Pump flow (average)
Pump flow (minimum)
Pump flow (maximum)
Placement signal
Placement signal timescale
Placement signal display range minimum
Placement signal display range maximum
Motor current
Motor current timescale
Motor current display range minimum
Motor current display range maximum
Motor speed
Pump run time
Mean AOP timescale
Mean AOP display range minimum
Mean AOP display range maximum
Cardiac output, flow and native cardiac output timescale
Cardiac output, flow and native cardiac output display range minimum
Cardiac output, flow and native cardiac output display range maximum
Purge flow timescale
Purge flow display range minimum
Purge flow display range maximum
Purge pressure timescale
Purge pressure display range minimum
Purge pressure display range maximum The server 218 is accessible, via the network 216, by monitoring stations, exemplified by monitoring stations 222 and 224 (FIG. 2). Each monitoring station 222-244 may be a personal computer (PC). An optional web server 226 may facilitate access by the monitoring stations 222-224 to the central server 218. The monitoring stations 222-224 may, thereby, fetch from the data store 220, and display real-time and/or historical operational data and/or alarms on display screens for viewing by the medical personnel 206-208. The central server 218 may include an application programming interface (API) (not shown) to facilitate fetching data from the data store 220.

Figure 3:
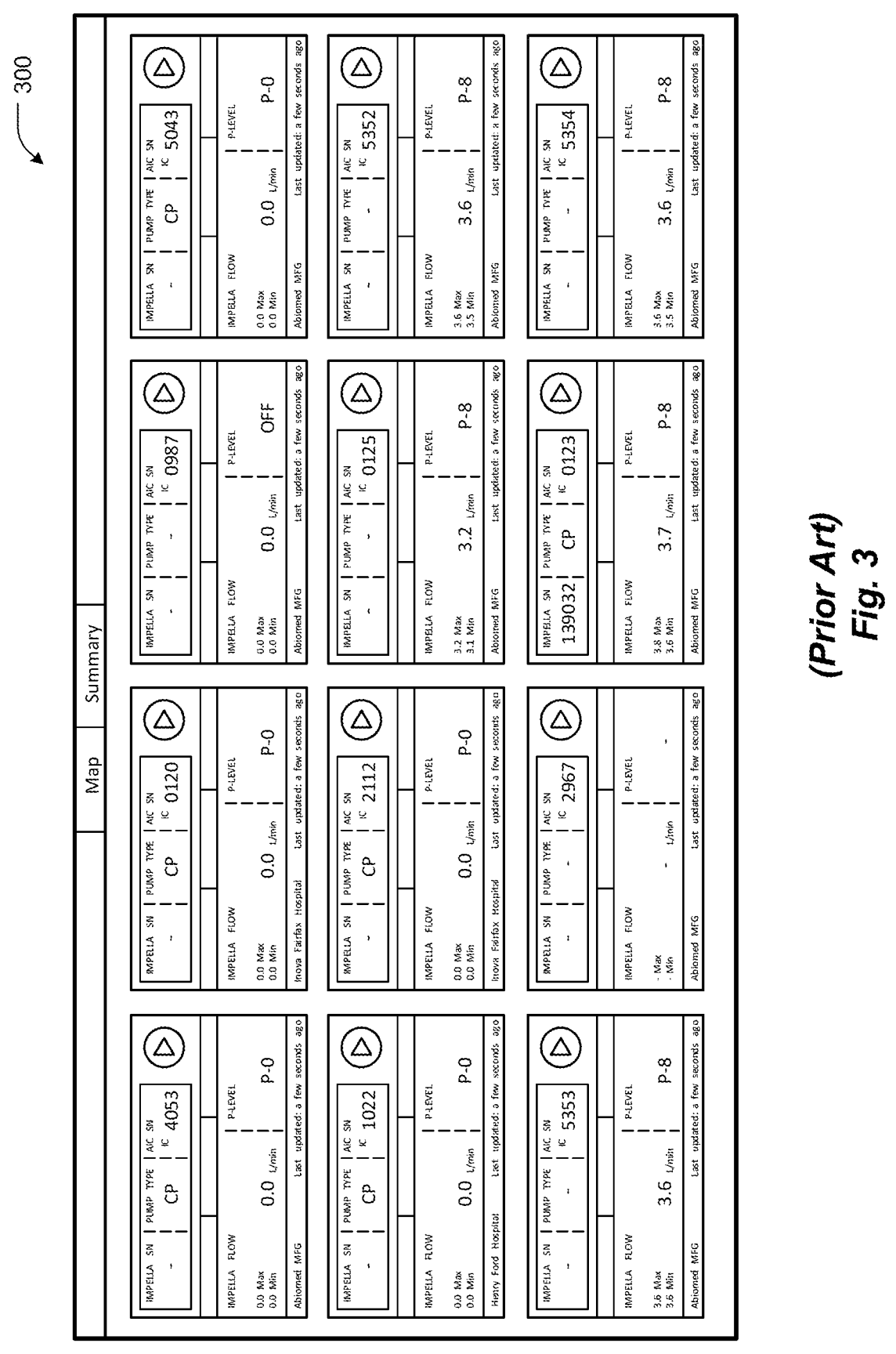

FIG. 3 is an exemplary hypothetical display 300 provided by a monitoring station 222-224 of FIG. 2. Thus, the server 218 provides a cloud-based system 228 (FIG. 2), by which the medical personnel 206-208 can monitor the patients 200-204. Some aspects of the cloud-based system 228 are described in U.S. Pat. Publ. Nos. 2020/0098473, 2020/0312450, 2020/0314207, 2020/0302206 and 2020/0411181, the entire contents of each of which are hereby incorporated by reference herein, for all purposes. A suitable cloud-based system 228 is available from Abiomed, Inc. under the trade name Impella Connect® remote heart pump management system.

Embodiment I

An embodiment of the present invention provides a heart pump data synchronizer that facilitates identification, by a human user, of at least one data type and a time or time range of data stored in the data store 220 (FIG. 2). This embodiment obtains the identified data from the data store 220 and displays the data on an output portal. A nurse or technician (a "user") may observe the data displayed on the output portal and enter the data into a computer terminal coupled to an EMR system. Advantageously, the user need not visit the patient 200-204 to obtain the data. For example, an output portal may be configured to operate on a computer terminal located at a nursing station. Advantageously, the user may obtain data for a previous time period. Thus, the user need not necessarily access the output portal at regular or timely intervals. Instead, the user may access the output portal when the user is not otherwise busy, and yet the user has access to data captured at prescribed intervals or times.

Figure 4:
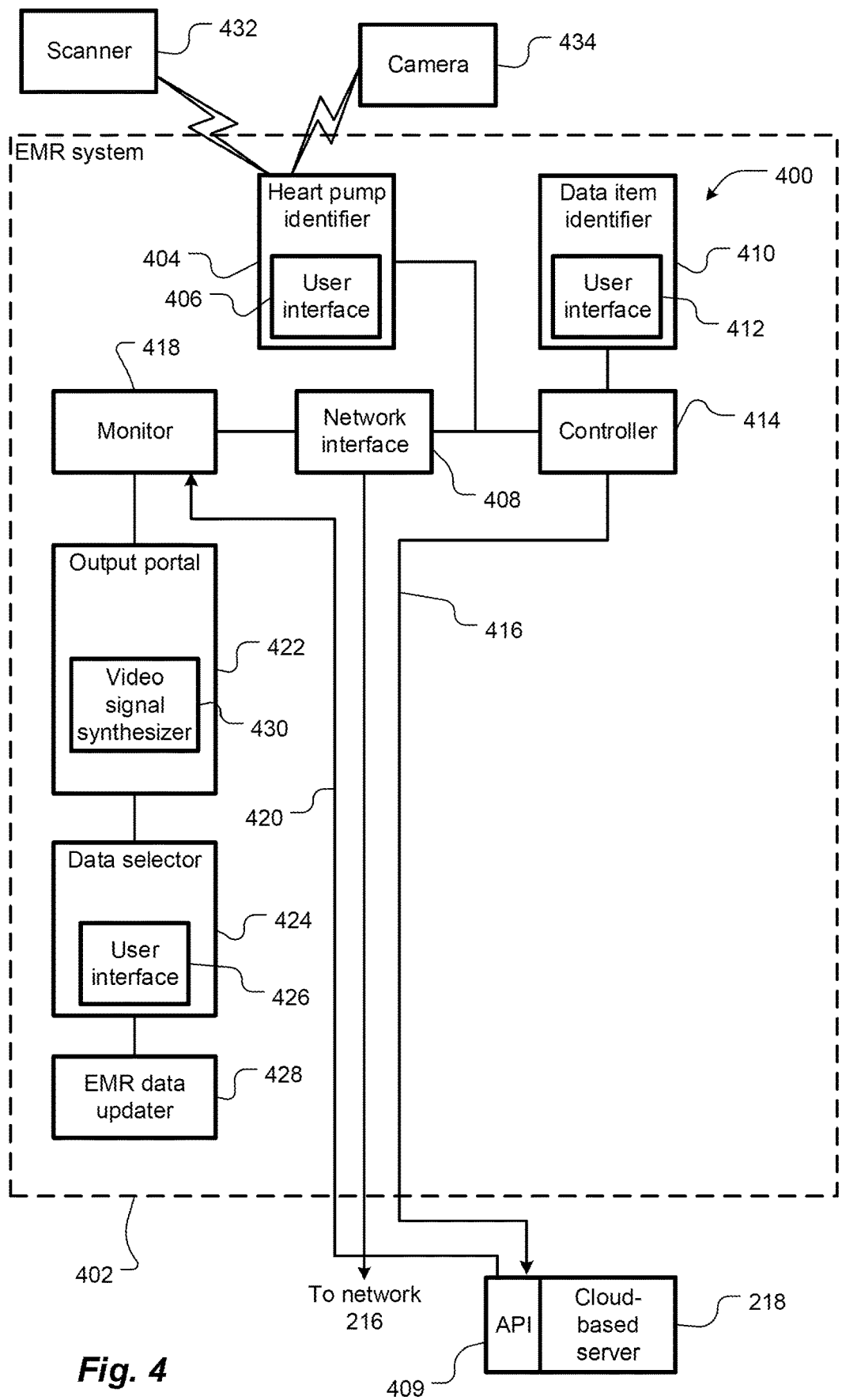
FIG. 4 is a schematic block diagram of an exemplary heart pump data synchronizer, according to an embodiment of the present invention.

FIG. 4 is a schematic block diagram of an exemplary heart pump data synchronizer 400, according to an embodiment of the present invention. One or more portions of the heart pump data synchronizer 400 may be configured for addition to, and operation within, an EMR system 402. The heart pump data synchronizer 400 provides the user access to the time-correlated data stored in the data store 220 (FIG. 2), and facilitates the user entering user-specified data items into the EMR system 402.

Many EMR systems provide documented application programming interfaces (API) to facilitate integrating applications ("add-ons") into the EMR systems, so the add-on applications are executed within the EMR system. Such an add-on application is referred to herein as being configured for addition to, and operation within, an EMR system. Similarly, many EMR systems provide APIs to facilitate add-on applications fetching and storing data in the EMR, in relation to identified patients. Some EMR systems provide interfaces that conform to one or more well-known interoperability standards, such as Consolidated CDA (C-CDA), Health Level Seven International (HL7) and Fast Healthcare Interoperability Resources (FHIR). FHIR is a standard for exchanging healthcare information electronically.

Figure 5:
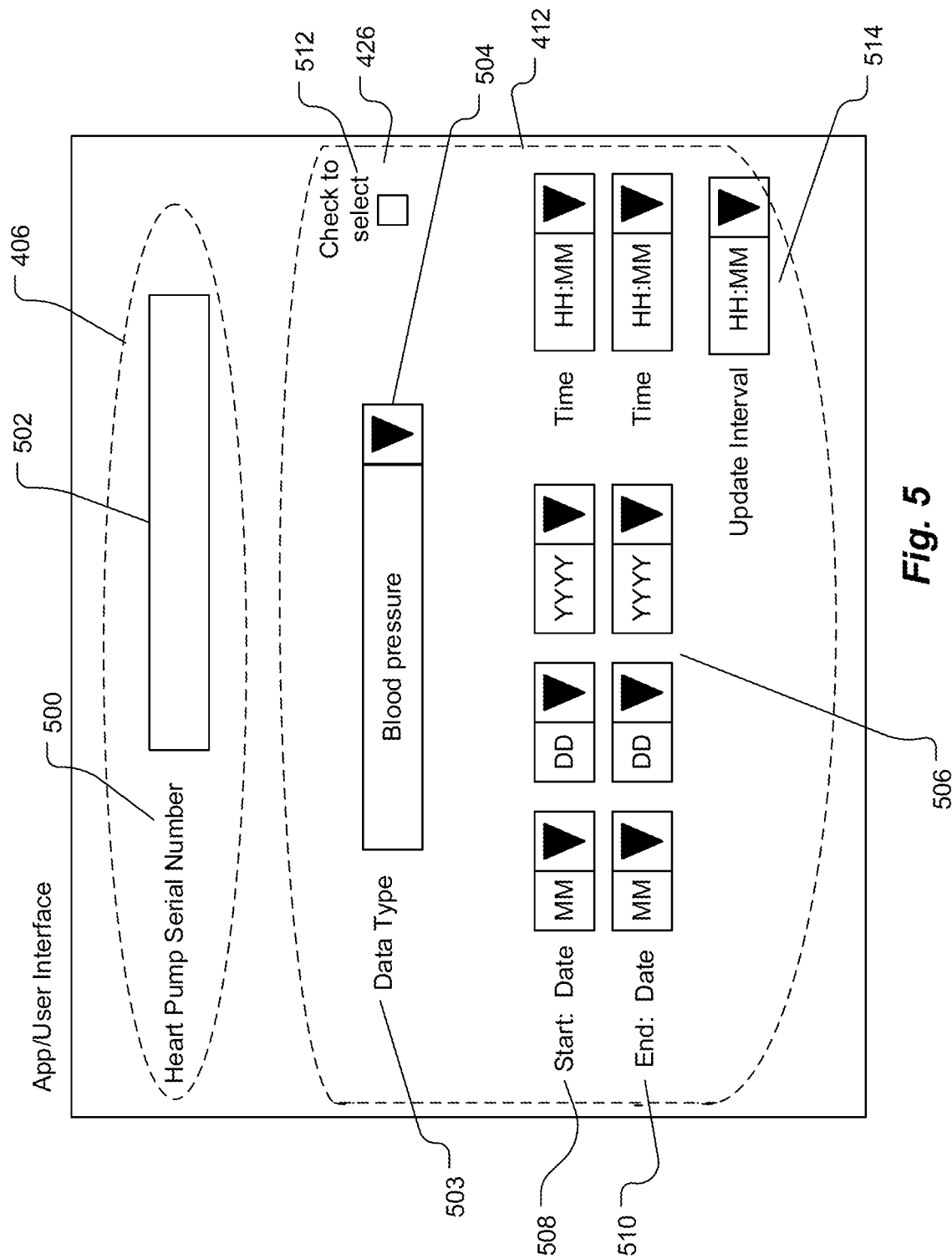
FIG. 5 illustrates a user interface of the heart pump data synchronizer of FIG. 4, according to an embodiment of the present invention.

A heart pump identifier 404 is configured for addition to, and operation within, the EMR system 402. The EMR system 402 stores information about a plurality of heart pump patients 200-204 and a plurality of non-heart pump patients, exemplified by non-heart pump patients 230 and 232 (FIG. 2). The heart pump identifier 404 includes a first user interface 406. FIG. 5 illustrates the first user interface 406, according to one embodiment. The first user interface 406 is configured to display a first prompt 500 to a user and to input a locally-entered identifier, such as a heart pump identifier or a patient identifier, in an input field 502. The heart pump identifier may, for example, include a heart pump model number or name, serial number, and/or manufacturer name, etc. In some embodiments, the locally-entered identifier is a patient identifier, such as a patient identification number, and the first prompt 500 is suitably modified. As used herein, "locally-entered" means the identifier is entered on an input device, such as a keyboard, touchscreen or the like, proximate the display device that displays the first prompt 500 and by the user who observes the first user interface 406 and the first prompt 500.

Returning to FIG. 4, a network interface 408 is configured for addition to, and operation within, the EMR system 402. The network interface 408 is configured to communicate via a wide-area computer network, for example the network 216 (FIG. 1), with a cloud-based server, such as the server 218 of the cloud-based system 228. Typically, the cloud-based server 218 is distinct from, and otherwise lacks a communication link with, the EMR system 402. The network interface 408 may communicate with the cloud-based server 218 via an application programming interface (API) 409 provided by the cloud-based server 218.

As discussed with respect to FIG. 2, the cloud-based server 218 stores historical time-correlated operation data about a plurality of implanted heart pumps 210-214. Time-correlated means the time at which data was collected is stored in association with the data, or the time can be calculated. Consequently, data for a time, or a time period, can be selected within the cloud-based server 218.

The historical operation data includes a plurality of data types for each implanted heart pump 210-214. Examples of the data types are shown in FIGS. 1 and 3, including pump type, blood flow rate, minimum blood flow rate, maximum blood flow rate, heparin flow rate, blood pressure and hospital name. Other data types, not shown in FIGS. 1 and 3, may also be used. Examples of such data are discussed herein with respect to Table 1.

Returning again to FIG. 4, a data item identifier 410 is configured for addition to, and operation within, the EMR system 402. The data item identifier 410 includes a second user interface 412. FIG. 5 illustrates the second user interface 412, according to one embodiment. The second user interface 412 is configured to display a second prompt 503 to the user. The second user interface 412 is further configured to input from the user, in association with the locally-entered identifier 502, an identification of at least one data type 504 of the plurality of data types stored by, and available from, the cloud-based server 218. The second user interface 412 is further configured to input from the user a time 506 (for example, as specified by a start date/time 508 and an end date/time 510). If the user enters or selects only a single date/time, the time 506 is considered to be a single point in time.

The data type 504 and aspects of the start and end times 508-510 may be solicited from, and input by, the user with pull-down lists, as suggested by the downward oriented triangles in FIG. 5. The pull-down list may be populated based on data types that are available from the cloud-based server 218. In some embodiments, the data item identifier 410 queries the cloud-based server 218 for a list of data types that may be requested from the cloud-based server 218. Any other suitable user interface graphical or textual control element or combination of elements, such as text boxes, calendars, sliders and/or spinners, may be used.

FIG. 5 illustrates one data type prompt 503 and one pull-down list 504 for selecting a data type. Other embodiments (not shown) of the second user interface 412 include multiple pull-down lists, or other suitable user interface graphical or textual control elements or combinations thereof, to facilitate the user selecting multiple data types. Alternatively, the second user interface 412 may use a single pull-down 504 or other user interface control to repeatedly solicit data type inputs from the user until the user indicates that the user has completed entering data types, such as by clicking an "OK" button (not shown).

In use, a clinician accesses the first user interface 406 of the heart pump identifier. The clinician enters a heart pump identifier, such as a heart pump serial number, or a patient identifier, such as a patient identification number, in the first user interface 406. The clinician enters or selects one or more data types 504 and a time 506. By these inputs, the clinician indicates which heart pump or patient is of interest. These inputs also indicate which data type(s), collected from the heart pump controller 210-214 that is connected to the heart pump or patient of interest 200-204, is(are) of interest. These inputs also specify a single point in time 506 at, or a span of time 506 over, which the data are of interest. These inputs direct the heart pump data synchronizer 400 to fetch the data of interest from the server 218.

A controller 414 (FIG. 4) is coupled to the heart pump identifier 404, the network interface 408 and the data item identifier 410. The controller 414 is configured for addition to, and operation within, the EMR system 402. The controller 414 is further configured, in response to receipt of the locally-entered identifier 502, the at least one data type identification 504 and the time 506, to send, via the network interface 408, the locally-entered identifier 502, the at least one data type identification 504, the time 506 and a request 416 for data that corresponds to the locally-entered identification 502 (a heart pump identifier or a patient identifier), the data type identification(s) 504 and the time 506, to the cloud-based server 218. As used herein, "corresponding data" or "data corresponding thereto" means data about the patient and/or heart pump identified by the locally-entered identifier 502, where the data is of a type(s) identified by the data type identifier(s) 504, and the data was collected during all or a portion of the time 506.

A monitor 418 is coupled to the network interface 406. The monitor 418 is configured for addition to, and operation within, the EMR system 402. The monitor 418 is configured to receive, via the network interface 408, from the cloud-based server 218, the corresponding data 420 transmitted by the cloud-based server 218 in response to the request 416.

An output portal 422 is coupled to the monitor 418. The output portal 422 is configured for addition to, and operation within, the EMR system 402. The output portal 422 is configured to display the corresponding data 420 to the user, such as on a display screen. For example, the output portal 422 may be implemented as a web page viewer, and the cloud-based server 218 may be configured to provide an HTML-formatted web page that contains the requested data 420.

Once the data 420 is displayed to the user, the user can manually enter the data into the EMR system using a conventional EMR user interface, or use the data for another purpose. However, as noted, data entered manually into an EMR system is often unstructured data and, therefore, of limited value to automated systems. Nevertheless, this embodiment enables clinicians to enter past heart pump data into the EMR system, and to enter this data without visiting, and therefore without disturbing, patients.

Figure 7:
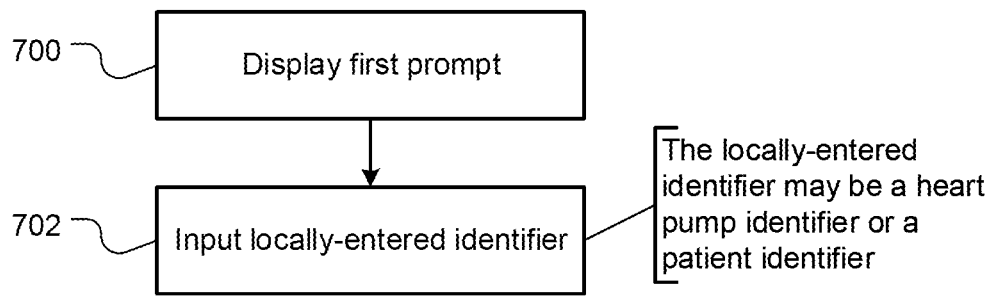
FIG. 7 is a flowchart that schematically illustrates operations performed by a heart pump identifier of the heart pump data synchronizer of FIG. 4, according to an embodiment of the present invention.

FIG. 7 is a flowchart that schematically illustrates operations performed by the heart pump identifier 404. At 700, the heart pump identifier 404 displays the first prompt 500 to the user. At 702, the heart pump identifier 404 inputs the locally-entered identifier 502. As noted, the locally-entered identifier 502 may be a heart pump identifier or an identifier of a patient 200-204 having an implanted heart pump.

Figure 8:
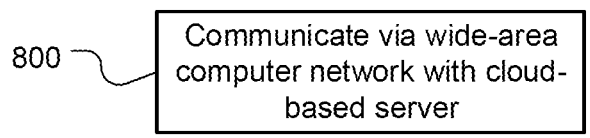
FIG. 8 is a flowchart that schematically illustrates operations performed by a network interface of the heart pump data synchronizer of FIG. 4, according to an embodiment of the present invention.

FIG. 8 is a flowchart that schematically illustrates operations performed by the network interface 408. At 800, the network interface 408 communicates via the wide-area computer network 216 with the cloud-based server 218.

Figure 9:
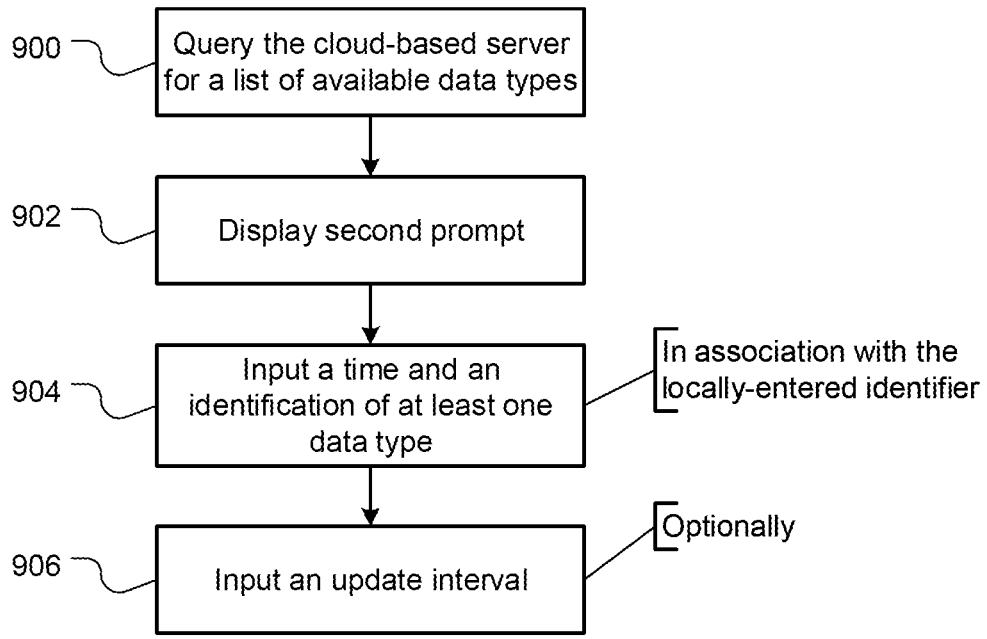
FIG. 9 is a flowchart that schematically illustrates operations performed by a data item identifier of the heart pump data synchronizer of FIG. 4, according to embodiments of the present invention.

FIG. 9 is a flowchart that schematically illustrates operations performed by the data item identifier 404. Optionally, at 900, the data item identifier 404 queries the cloud-based server 218 for a list of available data types. This information may be used to generate the second prompt 503. At 902, the data item identifier 404 displays the second prompt 503 to the user. At 904, the data item identifier 404 inputs a time 506 and an identification 504 of at least one data type of the plurality of data types. Since the first and second prompts 500 and 503 are displayed on the same device at the same, or nearly same, time, and the user enters the locally-entered identifier 502, the time 506 and the identification 504 of the at least one data type on the same device and an nearly the same time, the time 506 and the identification 504 of the at least one data type are referred to herein as being input "in association with" the locally-entered identifier 502.

Figure 10:
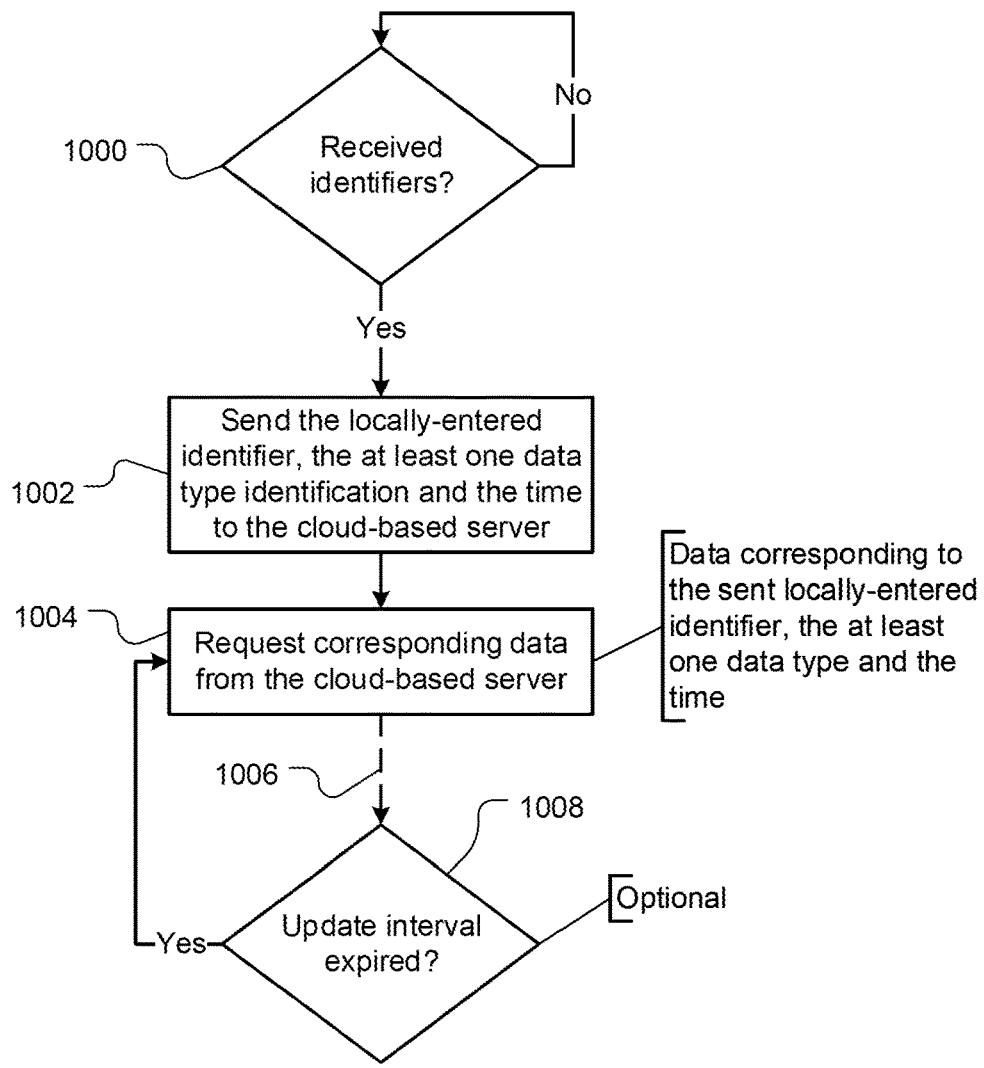
FIG. 10 is a flowchart that schematically illustrates operations performed by a controller of the heart pump data synchronizer of FIG. 4, according to embodiments of the present invention.

FIG. 10 is a flowchart that schematically illustrates operations performed by the controller 414. At 1000, the controller 414 awaits receipt of the locally-entered identifier 502, the data item identifier 410 of the at least one data type identification 504 and the time 506. At 1002, in response to receipt of these items, the controller 414 sends the locally-entered identifier 502, the at least one data type identification 504 and the time 506 to the cloud-based server 218. At 1004, the controller 414 sends the request 416 for corresponding data to the cloud-based server 218.

Figure 11:
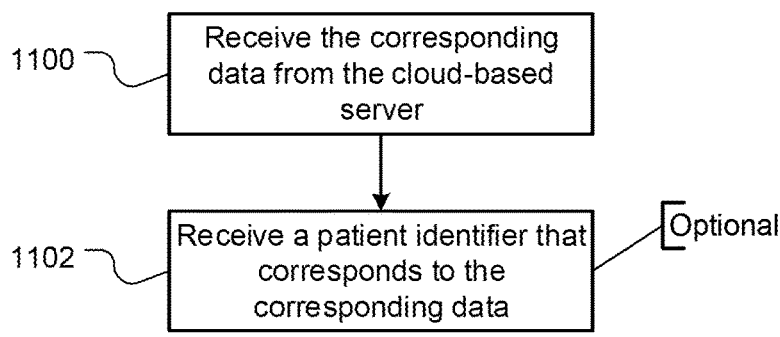
FIG. 11 is a flowchart that schematically illustrates operations performed by a monitor of the heart pump data synchronizer of FIG. 4, according to embodiments of the present invention.

FIG. 11 is a flowchart that schematically illustrates operations performed by the monitor 418. At 1100, the monitor 418 receives the corresponding data 420 transmitted by the cloud-based server 218 in response to the request 416. Additional operations by the monitor 418 are described herein.

Figure 12:
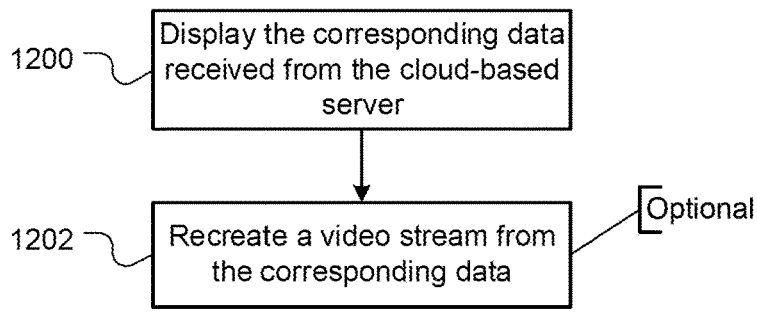
FIG. 12 is a flowchart that schematically illustrates operations performed by an output portal of the heart pump data synchronizer of FIG. 4, according to embodiments of the present invention.

FIG. 12 is a flowchart that schematically illustrates operations performed by the output portal 422. At 1200, the output portal 422 displays the corresponding data 420, received from the cloud-based server 218, to the user.

Embodiment II

In another embodiment, a graphical user interface (GUI) enables a user to graphically identify data that is of interest, such as by dragging a mouse cursor through displayed data, and the system fetches the identified data from the data store 220, and then stores the selected data in the EMR system 402. Essentially, this embodiment enables the user to "copy and paste" data from the data store 220 to the EMR system 402, without requiring the user to manually enter the data. In some embodiments, the data is stored as structured data in the EMR system 402.

In such an embodiment, the heart pump data synchronizer 400 (FIG. 4) includes a data selector 424. The data selector 424 is configured for addition to, and operation within, the EMR system 402. The data selector 424 includes a third user interface 426 configured to display a third prompt to the user. The data selector 424 is also configured to input from the user an indication identifying at least a portion of the corresponding data displayed to the user. As discussed with respect to the user interface 504, any suitable user interface graphical control element or combination of elements may be used.

FIG. 5 illustrates an embodiment of the data selector 424 third user interface 426 and the third prompt 512. In this embodiment, a check box 426, or another suitable graphical or textual element, enables the user to select the data type indicated or selected via the data type selector 504. An embodiment that has multiple data type selectors 504 may have a number of check boxes 426 that equals the number of data type selectors 504.

Figure 6:
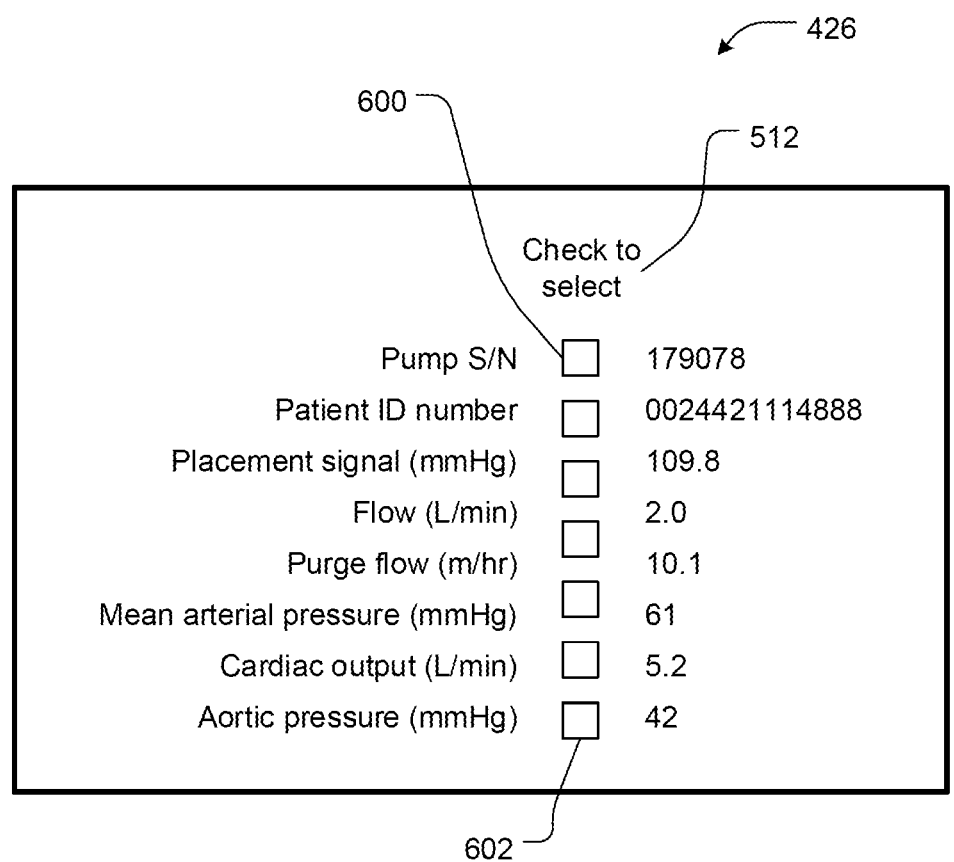
FIG. 6 illustrates a user interface of the heart pump data synchronizer of FIG. 4, according to another embodiment of the present invention.

FIG. 6 illustrates another embodiment of the third user interface 426. In this embodiment, after the user selects the data type(s) using the second user interface 412, for example as discussed with reference to FIG. 5, the data selector 424 displays the third prompt 512 and data returned by the cloud-based server 218, for example one data type per line, as shown in FIG. 6. Check boxes, represented by check boxes 600 and 602, enable the user to select ones of the data items.

Alternatively, in some embodiments, the data selector 424 displays a cursor (not shown), and the user drags the cursor though displayed data item(s) to indicate the identification of the at least a portion of the corresponding data. The data selector 424 can cause the dragged-through data to display in as different color, to highlight the selection.

The heart pump data synchronizer 400 may also include an EMR data updater 428 (FIG. 4). The EMR data updater 428 may be configured for addition to, and operation within, the EMR system 402. The EMR data updater 428 may be configured to store in the EMR system 402 the at least a portion of the corresponding data displayed to the user or selected by the user. In other words, the EMR data updater 428 may be configured to store in the EMR system 402 the data selected by the user.

Since the data items returned by the cloud-based server 218 are each sourced from named fields in the data store 220, if any of the displayed data types are selected by the user, the field names may be used to identify the type of data being stored in the EMR system. That is, the data may be stored in the EMR system as structured data.

In any case, the data selected by the user is stored in the EMR system in association with a patient identifier. If the locally-entered identifier 502 is a patient identifier, the EMR data updater 428 may use the locally-entered identifier 502 as a key to specify the patient's record in the EMR system 402, so the data stored by the EMR data updater 428 is stored in the EMR system 402 in association with a patient identifier.

Data stored in the EMR system 402 is correlated to patients. Optionally, to relieve the user from entering a patient identifier, the heart pump identification may be used to infer the patient identification. Often, the data in the historical data store 220 includes heart pump identification information, such as model identification and serial number. Furthermore, the historical data store 220 often stores a patient name or other patient identifier in association with heart pumps that are implanted. Thus, the heart pump data synchronizer 400 may use the locally-entered heart pump identifier 502 (FIG. 5) to look up the identification of the patient associated with that heart pump. The heart pump data synchronizer 400 may then use the inferred patient identifier to store the data in the EMR system in association with the correct patient. Automatically inferred heart pump identifiers, such as those read by scanning or photographing the heart pump, may be used similarly.

That is, if the locally-entered identifier 502 is a heart pump identifier, the data stored by the cloud-based server 218 may include a patient identifier for each heart pump identifier. In this case, the cloud-based server 218 sends the patient identifier along with the requested data items, and the EMR data updater 428 may use the patient identifier sent by the cloud-based server 218 as a key to specify the patient's record in the EMR system 402, so the data stored by the EMR data updater 428 is stored in the EMR system 402 in association with a patient identifier.

Optionally, each implanted heart pump may be mechanically coupled to a respective heart pump controller 200-204 that includes a display screen 104 (FIG. 1). Operation data 102 of the implanted heart pump may be displayed on the display screen 104. Each heart pump controller 200-204 may be configured to send to the cloud-based server 218 a respective video stream that represents contents of the display screen 104.

The historical time-correlated operation data stored by the cloud-based server 218 may be at least partially derived by the cloud-based server 218 from respective video streams from respective heart pump controllers 200-204. For example, each video stream may represent contents of the screen 104 of a heart pump controller 200-204. The corresponding data 420 received by the monitor 418 from the cloud-based server 218 may be non-video data. For example, the corresponding data 420 may be in the form of network packets that contain numbers that directly represent the corresponding data 420 items, such as blood pressure.

The output portal 422 may include a video signal synthesizer 430 configured to at least partially recreate, from the corresponding data 420, a video stream to thereby display the corresponding data 420 to the user. Essentially, the video signal synthesizer 430 creates a duplicate of at least a portion of the display screen 104 of the heart pump controller 200-204. By this mechanism, the user can essentially see the display screen 102, or at least a portion of the display screen 102, of a heart pump controller 200-204 in near real time, without entering the patient's room.

The locally-entered heart pump identifier 502 may include a serial number of a respective implanted heart pump. The heart pump data synchronizer 400 may also include a scanner 432 configured to read a barcode that represents the heart pump identifier and thereby provide the locally-entered heart pump identifier 502. A barcode, including a quick response (QR) code, is a machine-readable optical label that contains information about the item to which it is attached. In such embodiments, the user need not manually enter the heart pump identifier. Since these identifiers can be long and/or arbitrary, eliminating a need for a human to manually enter the identifier reduces the likelihood of error. The scanner 432 may be wirelessly communicatively coupled to the heart pump identifier 404.

The heart pump data synchronizer 400 may include a camera 434 configured to read indicia that represents the heart pump identifier and thereby provide the locally-entered heart pump identifier. The indicia may be text or a barcode. The camera 434 may be a camera of a mobile phone. Optical character recognition (OCR) software may be used to process an image produced by the camera 434 to derive the locally-entered heart pump identifier. The camera 434 can reduce the likelihood of human error entering the locally-entered heart pump identifier. The camera 434 may be wirelessly communicatively coupled to the heart pump identifier 404.

The network interface 408 may be configured to communicate with the cloud-based server 218 via an application programming interface (API) provided by the cloud-based server 218. As note in Wikipedia, an application programming interface (API) is a computing interface to a software component or a system that defines how other components or systems can use it. An API defines the kinds of calls or requests that can be made, how to make them, the data formats that should be used, the conventions to follow, etc. Some APIs must be documented, while others are designed so that they can be "interrogated" to determine supported functionality. Since other components/systems rely only on the API, the system that provides the API can (ideally) change its internal details "behind" that API without affecting its users.

Figure 13:
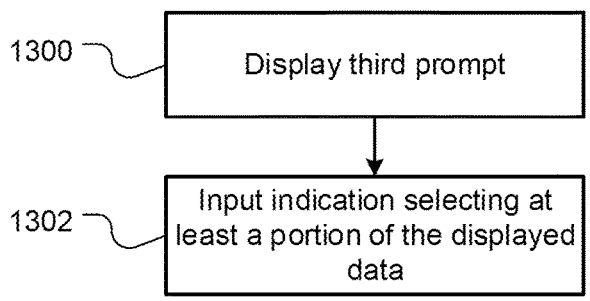
FIG. 13 is a flowchart that schematically illustrates operations performed by a data selector of the heart pump data synchronizer of FIG. 4, according to an embodiment of the present invention.

FIG. 13 is a flowchart that schematically illustrates operations performed by the data selector 424. At 1300, the data selector 424 displays the third prompt 512 to the user. At 1302, the data selector 424 inputs the indication 426 or 600 selecting at least a portion of the corresponding data displayed to the user.

Figure 14:
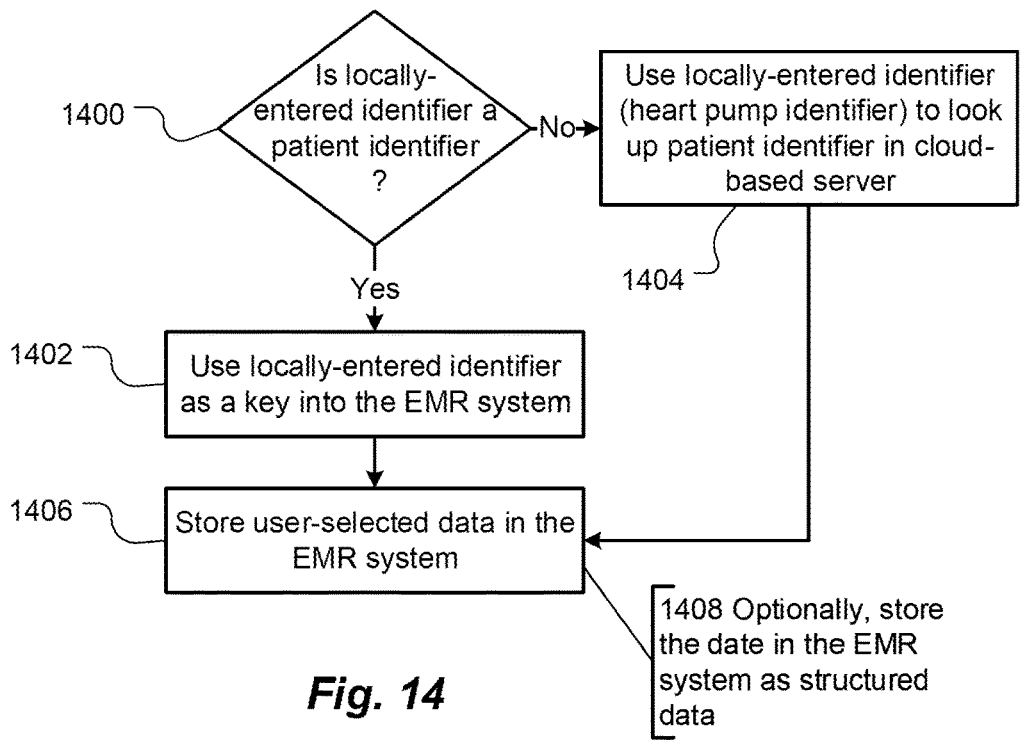
FIG. 14 is a flowchart that schematically illustrates operations performed by an EMR data updater of the heart pump data synchronizer of FIG. 4, according to embodiments of the present invention.

FIG. 14 is a flowchart that schematically illustrates operations performed by the EMR data updater 428. At 1400, if the locally-entered identifier 502 is a patient identifier, control passes to 1402, where the locally-entered identifier 502/patient identifier is used as a key to index into the EMR system 402. Optionally, if the locally-entered identifier 502 is a heart pump identifier, control passes to 1404. At 1404, the locally-entered identifier 502/pump identifier is used to look up a corresponding patient identifier in the cloud-based server 218. For example, the EMR data updater 428 may send the heart pump identifier to the cloud-based server 218 and request an identification of a patient that is associated, in the data store 220, with the heart pump identifier. Alternatively, the monitor 418 is configured to receive, via the network interface 408, from the cloud-based server 218, a patient identifier that corresponds to the data transmitted by the cloud-based server 218 in response to the request, as discussed herein.

At 1406, the EMR data updater 428 stores the selected data in the EMR system 402. In some embodiments, as indicated at 1408, the selected data is stored in the EMR system 402 as structured data. In any case, the selected data is stored in the EMR system 402 in association with the patient identifier, as determined at 1402 or 1404.

As noted, FIG. 11 is a flowchart that schematically illustrates operations performed by the monitor 418. Optionally, at 1102, the monitor 418 receives from the cloud-based server 218 a patient identifier that corresponds to the data 420 transmitted by the cloud-based server 218 in response to the request 416. This patient identifier may be used by the EMR data updater 428 as the key to the EMR system 402.

As noted, FIG. 12 is a flowchart that schematically illustrates operations performed by the output portal 422. Each implanted heart pump is mechanically coupled to a respective heart pump controller 210-214 that includes a display screen, on which are displayed operation data of the implanted heart pump. Each heart pump controller 210-214 may be configured to send to the cloud-based server 218 a respective video stream that represents contents of the display screen. The historical time-correlated operation data stored by the cloud-based server 218 may at least partially be derived by the cloud-based server 218 from respective video streams from respective heart pump controllers 210-214. The corresponding data 420 received by the monitor 418 from the cloud-based server 218 may be non-video data. Optionally, at 1202, the video signal synthesizer 430 at least partially recreates, from the corresponding data 420, a video stream to thereby display the corresponding data 420 to the user.

Embodiment III

Once programmed, the third embodiment periodically automatically fetches data from the heart pump controller 200-204 and/or the historical database 220, reformats the data as necessary, and stores the data into the EMR system 402. The reformatting may involve optical character recognition (OCR) of the real-time data from the heart pump controllers 210-214 or the historical data from the data store 220 prior to storing the data into the EMR system 402. The data may be stored in the EMR system 402 as structured data.

A user interface, similar to the start time 508 and end time 510 (FIG. 5) described herein, may be used to solicit, and accept from a user, a time frame during which the system is to periodically automatically fetch data from the heart pump controller 200-204 or the data store 220 and automatically store the data in the EMR system 402. A similar user interface may be used to solicit and accept a frequency at which the data is to be fetched, or a period between successive fetches. The data types to be fetched and stored may be solicited and accepted with a user interface similar to the user interfaces 504 and 426 described herein, with reference to FIGS. 4, 5 and 6.

This embodiment includes a heart pump identifier 404, a network interface 408, a data item identifier 410, a controller 414, a monitor 418 and an EMR data updater 428, as described herein.

However, the user interface 412 of the data item identifier 410 is further configured to input from the user, in association with the identification of the at least one data type, an update interval. FIG. 5 shows an exemplary prompt and input field 514 for receiving a user input of an update interval. The controller 414 is further configured, in response to receipt of the update interval 514, to automatically request updated corresponding data, via the network interface, from the cloud-based server 218, at the update interval. The EMR data updater 428 is further configured to automatically store, as structured data, in the EMR system 402, in association with the patient, the updated corresponding data 420 received by the monitor 418.

As noted, FIG. 9 is a flowchart that schematically illustrates operations performed by the data item identifier 410. At 906, the data item identifier 410 inputs the update interval 514.

As noted, FIG. 10 is a flowchart that schematically illustrates operations performed by the controller 414. Dashed arrow 1006 represents operations performed by other components, such as the monitor 418 and the EMR data updater 428. At 1008, after the update interval has expired, control returns to 1004, and the controller 414 repeatedly automatically requests updated corresponding data, via the network interface, from the cloud-based server 218. As indicated by the dashed arrow 1006, the monitor 418 receives (operation 1100, FIG. 11) the corresponding data 420 transmitted by the cloud-based server 218 in response to the request 416, and the EMR data updater 428 automatically stores (operation 1406, FIG. 14) the updated corresponding data 420 in the EMR system 402.

While the invention is described through the above-described exemplary embodiments, modifications to, and variations of, the illustrated embodiments may be made without departing from the inventive concepts disclosed herein. For example, although specific parameter values, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" or "step" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The heart pump data synchronizer 400, or portions thereof, may be implemented by one or more processors executing, or controlled by, instructions stored in a memory. Each processor may be a general-purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective prompts from one another and are not intended to necessarily indicate any particular order or total number of prompts in any particular embodiment. Thus, for example, a given embodiment may include only a second prompt and a third prompt.

The invention claimed is:

1. A cloud-based system for transferring historical, time-correlated operation data from a heart pump control database to an electronic medical records (EMR) database, the cloud-based system comprising:
   an EMR database that is accessible according to patient identifiers and that stores medical information about a plurality of patients;
   a network interface configured to communicate via a wide-area computer network;
   a heart pump control database that is accessible through the network interface via the wide-area computer network, wherein the heart pump control database stores historical, time-correlated operation data about a plurality of implanted heart pumps, and wherein the historical, time-correlated operation data comprises a plurality of data types for each implanted heart pump; and
   one or more processors communicatively coupled to the EMR database and the network interface, wherein the one or more processors are configured to:
   provide a first user interface to a display screen for display, wherein the first user interface comprises a first prompt for a locally-entered identifier comprising at least one of (a) an identifier of a patient having an implanted heart pump or (b) an identifier of the implanted heart pump;

provide a second user interface to the display screen for display, wherein the second user interface comprises a second prompt for a time and an identification of at least one data type of the plurality of data types, and wherein the time and the at least one identified data type are associated with the locally-entered identifier;

send, in response to receipt of the locally-entered identifier, the time, and the at least one identified data type via the network interface, the locally-entered identifier, the time, the at least one identified data type, and a request for data corresponding thereto to the heart pump control database;

receive, in response to the request for the corresponding data, via the network interface, from the heart pump control database, the corresponding data;

provide the corresponding data to the display screen for display;

provide a third user interface to the display screen for display, wherein the third user interface comprises a third prompt for a selection of a portion of the corresponding data displayed on the display screen; and automatically store, as structured data in the EMR database, in association with a patient identifier, the selected portion of the corresponding data.

2. The cloud-based system of claim 1, wherein:

each implanted heart pump is mechanically coupled to a respective heart pump controller that includes a display screen for displaying operation data about that implanted heart pump;

each respective heart pump controller is configured to send to the heart pump control database a respective video stream that represents the operation data displayed on the display screen of that heart pump controller;

the historical, time-correlated operation data stored by the heart pump control database is at least partially derived by the heart pump control database from the respective video streams from the respective heart pump controllers;

the corresponding data received by the one or more processors from the heart pump control database is non-video data; and the one or more processors are further configured to at least partially recreate, with a video signal synthesizer, from the corresponding data, a video stream to display on the display screen.

3. The cloud-based system of claim 1, wherein the locally-entered identifier comprises the identifier of the implanted heart pump, and wherein the identifier of the implanted heart pump is a serial number.

4. The based system of claim 1, wherein the locally-entered identifier comprises the identifier of the patient having the implanted heart pump, and wherein the identifier of the patient having the implanted heart pump is an identification number.

5. The based system of claim 1, further comprising a scanner configured to read a barcode that represents the identifier of the implanted heart pump, and wherein the locally-entered identifier comprises the identifier of the implanted heart pump.

6. The based system of claim 5, wherein the scanner is further configured to automatically transmit the identifier of the implanted heart pump to the one or more processors after reading the barcode.

7. The cloud-based system of claim 1, further comprising a camera configured to read indicia that represents the identifier of the implanted heart pump, and wherein the locally-entered identifier comprises the identifier of the implanted heart pump.

8. The cloud-based system of claim 7, wherein the camera is further configured to automatically transmit the identifier of the implanted heart pump to the one or more processors after reading the indicia.

9. The cloud-based system of claim 1, wherein the network interface is configured to communicate with the heart pump control database via an application programming interface (API) provided by the heart pump control database.

10. The cloud-based system of claim 1, wherein the plurality of data types comprises at least one of blood pressure, blood flow rate, motor speed, a motor current, purge pressure, or purge flow rate.

11. The cloud-based system of claim 1, wherein the first prompt of the first user interface comprises an input field for receiving text.

12. The cloud-based system of claim 1, wherein the second prompt of the second user interface comprises a pull-down list populated with items corresponding to different ones of the plurality of data types.

13. The cloud-based system of claim 1, wherein the second prompt of the second user interface comprises a pull-down list populated with items corresponding to different times.

14. The cloud-based system of claim 1, wherein the second prompt of the second user interface comprises (a) a first pull-down list populated with items corresponding to different ones of the plurality of data types and (b) a second pull-down list populated with items corresponding to different times.

15. The cloud-based system of claim 1, wherein the third prompt of the third user interface comprises a check box.

16. The cloud-based system of claim 1, wherein the third prompt of the third user interface comprises a plurality of check boxes, wherein each check box corresponds to a different one of the plurality of data types.

17. The cloud-based system of claim 1, further comprising the display screen, wherein the display screen is configured to simultaneously display the first, second, and third user interfaces.

18. The cloud-based system of claim 17, wherein the first prompt of the first user interface comprises an input field for receiving text, wherein the second prompt of the second user interface comprises (a) a first pull-down list populated with items corresponding to different ones of the plurality of data types and (b) a second pull-down list populated with items corresponding to different times, and wherein the third prompt of the third user interface comprises a check box.

19. A method for transferring historical, time-correlated operation data from a heart pump control database to an electronic medical records (EMR) database, the method comprising:

displaying, with a display screen, a first user interface comprising a first prompt for a locally-entered identifier comprising at least one of (a) an identifier of a patient having an implanted heart pump or (b) an identifier of the implanted heart pump;

displaying, with the display screen, a second user interface comprising a second prompt for a time and an identification of at least one data type of a plurality of data types, wherein the time and the at least one identified data type are associated with the locally-entered identifier;

receiving, with one or more processors, the locally-entered identifier, the time, and the at least one identified data type;

sending, with the one or more processors, in response to receipt of the locally-entered identifier, the time, and the at least one identified data type, via a network interface, the locally-entered identifier, the time, the at least one identified data type, and a request for data corresponding thereto to a heart pump control database, wherein the heart pump control database is accessible through the network interface via a wide-area computer network, wherein the heart pump control database stores historical, time-correlated operation data about a plurality of implanted heart pumps, and wherein the historical, time-correlated operation data comprises the plurality of data types for each implanted heart pump;

receiving, with the one or more processors, in response to the request for the corresponding data, via the network interface, the corresponding data from the heart pump control database;

displaying, with the display screen, the corresponding data;

displaying, with the display screen, a third user interface comprising a third prompt for a selection of a portion of the corresponding data displayed on the display screen; and automatically storing, with the one or more processors, as structured data in an EMR database, in association with a patient identifier, the selected portion of the corresponding data, wherein the EMR database is accessible according to patient identifiers and stores medical information about a plurality of patients.

20. A non-transitory computer readable storage medium having instructions stored thereon that, when executed by one or more processors, cause the one or more processors to:

provide a first user interface to a display screen for display, wherein the first user interface comprises a first prompt for a locally-entered identifier comprising at least one of (a) an identifier of a patient having an implanted heart pump or (b) an identifier of the implanted heart pump;

provide a second user interface to the display screen for display, wherein the second user interface comprises a second prompt for a time and an identification of at least one data type of a plurality of data types, wherein the time and the at least one identified data type are associated with the locally-entered identifier;

receive the locally-entered identifier, the time, and the at least one identified data type;

send, in response to receipt of the locally-entered identifier, the time, and the at least one identified data type, via a network interface, the locally-entered identifier, the time, the at least one identified data type, and a request for data corresponding thereto to a heart pump control database, wherein the heart pump control database is accessible through the network interface via a wide-area computer network, wherein the heart pump control database stores historical, time-correlated operation data about a plurality of implanted heart pumps, and wherein the historical, time-correlated operation data comprises the plurality of data types for each implanted heart pump;

receive, in response to the request for the corresponding data, via the network interface, the corresponding data from the heart pump control database;

provide the corresponding data to the display screen for display;

provide a third user interface to the display screen for display, wherein the third user interface comprises a third prompt for a selection of a portion of the corresponding data displayed on the display screen; and automatically store, as structured data in an electronic medical records (EMR) database, in association with a patient identifier, the selected portion of the corresponding data, wherein the EMR database is accessible according to patient identifiers and stores medical information about a plurality of patients.

* * * * *